(12) United States Patent
Nishi et al.

(10) Patent No.: US 6,196,009 B1
(45) Date of Patent: Mar. 6, 2001

(54) FREEZER/REFRIGERATOR VEHICLE

(75) Inventors: Kazuhiro Nishi; Minori Higuchi; Masato Doi, all of Tokyo (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/416,527

(22) Filed: Oct. 12, 1999

(30) Foreign Application Priority Data

Oct. 12, 1998 (JP) ................................. 10-289215

(51) Int. Cl.$^7$ ................................ F25D 11/00; B60P 3/20
(52) U.S. Cl. .................... 62/155; 62/323.1; 62/323.3; 123/339.17
(58) Field of Search ............................ 62/155, 234, 151, 62/156, 323.1, 323.4, 243, 81, 277, 278, 133, 228.4, 323.3; 123/339.16, 339.17, 339.18

(56) References Cited

U.S. PATENT DOCUMENTS

| | | | |
|---|---|---|---|
| 3,890,798 | * 6/1975 | Fujimoto et al. | ...................... 62/155 |
| 4,488,411 | * 12/1984 | Hara | ................................. 62/323.1 X |
| 4,694,657 | * 9/1987 | Vaugh | ................................. 62/155 X |
| 6,035,652 | * 3/2000 | Hashimoto | ...................... 123/339.17 |

* cited by examiner

*Primary Examiner*—Harry B. Tanner
(74) *Attorney, Agent, or Firm*—Antonelli, Terry, Stout & Kraus, LLP

(57) ABSTRACT

A freezer/refrigerator vehicle equipped with a refrigerating apparatus driven by a drive source which is an engine, mounted on a vehicle, for running the vehicle, comprising an idle-up means for operating a fuel feeding device of the engine under a first idle-up condition or under a second idle-up condition between the first idle-up condition and the no-load condition, and a control means. After the defrosting cycle is conducted for a predetermined period of time while the idle-up means is in operation under the second idle-up condition, the control means operates the idle-up means under the first idle-up condition and thereafter, brings the refrigerating apparatus back to the refrigerating cycle after the passage of a predetermined period of time.

2 Claims, 3 Drawing Sheets

FREEZER/REFRIGERATOR VEHICLE

FIELD OF THE INVENTION

The present invention relates to a freezer/refrigerator vehicle for transporting foods and the like in a frozen state or in a cold storage state. More particularly, the invention relates to a freezer/refrigerator vehicle equipped with a refrigerating apparatus driven by a drive source which is an engine for running the vehicle, that is mounted on a vehicle.

DESCRIPTION OF THE PRIOR ART

In recent years, freezer/refrigerator vehicles have been widely used for transporting foods and the like in a frozen state or in a cold storage state. As a drive source for driving the compressor of the refrigerating apparatus in the freezer/refrigerator vehicles, there are two types of a system in which a special engine exclusively used for the refrigerating apparatus is mounted and a system which utilizes the output of the engine for running the vehicle, that is mounted on the vehicle. In the vehicles of the former system, a special engine must be mounted and hence, invites an increase in the cost and weight and needs a space for mounting it. Therefore, the system that utilizes the output of the engine for running the vehicle has been generally employed.

The system which utilizes the output of the engine, mounted on the vehicle, for running the vehicle includes a system in which the compressor of the refrigerating apparatus is driven directly by the engine for running the vehicle via a clutch and a system in which an AC generator is driven by the engine for running the vehicle and the compressor of the refrigerating apparatus is driven by an AC motor driven by the output of the AC generator. The cooling performance of the refrigerating apparatus varies in proportion to the rotational speed of the compressor. in the system in which the compressor of the refrigerating apparatus is directly driven by the engine for running the vehicle, it has a problem that the engine rotational speed is low during the low-speed traveling of the vehicle or during the idling, and consequently, the cooling performance of the refrigerating apparatus decreases. Owing to its simple structure and simple control operation, however, this system has been widely practically used. On the other hand, in the system in which the compressor of the refrigerating apparatus is driven by the output of an AC motor that is driven by the engine for running the vehicle, the frequency of the AC electric power supplied to the AC motor is controlled by an inverter, making it possible to increase the rotational speed of the compressor irrespective of the rotational speed of the engine. Therefore, this system has now been generally used, and it is disclosed in, for example, Japanese Examined Patent Publication (Kokoku) No. 103137/1994.

In the system in which the compressor of the refrigerating apparatus is driven by utilizing the output of the engine for running the vehicle, there is a problem that the driving force of the engine during the idling (550 rpm in the case of, for example, a diesel engine) is so small that the engine causes hunting due to the load of the refrigerating apparatus. Accordingly, in the freezer/refrigerator vehicle equipped with a refrigerating apparatus driven, as a driving source, by the engine for running the vehicle, an idle-up means is provided for increasing the amount of feeding fuel in order to increase the engine rotational speed to, for example, about 800 rpm during the idling of the engine. Under the idle-up condition, the engine rotational speed is considerably higher than that under the no-load condition, with the consequence that engine noise becomes considerably great. Further, the engine for driving the compressor of the refrigerating apparatus must bear a large load when the external temperature is high, and must bear an extremely large load of the refrigerating apparatus particularly when the freezer/refrigerator vehicle gets directly a lot of the sunlight and the temperature on the outer wall of the refrigerating apparatus elevates up to about 70° C. To prevent occurrence of the hunting in the engine due to the load of the refrigerating apparatus, the idle-up means works to increase the amount of feeding fuel. Meanwhile, at night where no sunlight falls and the temperature of the external air is low, the load of the refrigerating apparatus decreases and the rotational speed of the engine needs not be so much increased. In the conventional freezer/refrigerator vehicle, however, the idle-up means solely increases the amount of feeding fuel even when the load of the refrigerating apparatus is small, like in the case where the load is large. Therefore, during the traffic jam in which the idling lasts long and, particularly, during the traffic jam at night, the engine noise during the idling arouses a problem.

Further, the freezer/refrigerator vehicle for delivering foods and the like in a frozen state or in a cold storage stage to the stores, must keep the refrigerating apparatus operated even when the vehicle parks at the store for unloading the cargoes and hence, the engine is operated under the idle-up condition. With the engine being operated under the idle-up condition (e.g., 800 rpm) for extended periods of time during the parking of the vehicle at the store, however, the engine noise could become a cause of noise pollution.

In order to solve the above-mentioned problems, the present applicants have proposed in Japanese Patent Applications Nos. 288310/1998 and 288311/1998 a freezer/refrigerator vehicle in which the idle-up means is constructed to work to operate the fuel feeding device under the first idle-up condition or under the second idle-up condition between the first idle-up condition and the no-load condition when the refrigerating apparatus is in operation during the idling of the engine, and the idle-up means is operated under the first idle-up condition when the load of the refrigerating apparatus is high or when the vehicle is not in a parking state, and is operated under the second idle-up condition when the load of the refrigerating apparatus is low or when the vehicle is in a parking state.

The refrigerating apparatus has a refrigerating cycle for circulating the coolant compressed by the compressor through a condenser and an evaporator, and a defrosting cycle for introducing the coolant compressed by the compressor into an evaporator without passing the condenser. When the refrigerating apparatus has worked in a state of the refrigerating cycle for a predetermined period of time (e.g., 3 hours), then, the defrosting cycle is executed for a predetermined period of time (e.g., 30 minutes) to remove frost adhered onto the evaporator. However, when, while the engine is in operation under the above-mentioned second idle-up condition, the defrosting cycle is executed and then the refrigerating cycle is resumed, the coolant compressed by the compressor just after the resumption has high temperature. Due to this, an overload is exerted on the compressor, whereby the rotational speed of the engine drops and it makes difficult to maintain the predetermined performance. In particular, when the AC motor for driving the compressor is controlled by the frequency, the AC motor can be no longer rotated.

SUMMARY OF THE INVENTION

The main object of the present invention is to provide a freezer/refrigerator vehicle that, even when the defrosting cycle is executed while the engine is in operation under a low idle-up condition, can smoothly conduct the subsequent refrigerating cycle.

In order to solve the above-mentioned main technical problem according to the present invention, there is provided a freezer/refrigerator vehicle equipped with a refrigerating apparatus which has a refrigerating cycle for circulating the coolant compressed by a compressor through a condenser and an evaporator and a defrosting cycle for introducing the coolant compressed by the compressor into the evaporator without passing the condenser, said refrigerating apparatus being driven by a drive source that is an engine for running the vehicle, mounted on a vehicle, comprising an idle-up means for operating a fuel feeding device of said engine under a first idle-up condition or under a second idle-up condition between said first idle-up condition and the no-load condition when said refrigerating apparatus is in operation during the idling of said engine;

a first timer means for counting the time in which said refrigerating apparatus has operated in said refrigerating cycle;

a second timer means for counting the time in which said refrigerating apparatus has operated in said defrosting cycle; and a control means for controlling said refrigerating apparatus and said idle-up means, said control means bringing said refrigerating apparatus to said defrosting cycle when the operation time counted by said first timer means has reached a predetermined refrigerating operation time, and bringing said refrigerating apparatus back to said refrigerating cycle when the operation time counted by said second timer means has reached a predetermined defrosting operation time, and said control means shifting said idle-up means to said first idle-up condition when the operation time counted by said second timer means has reached said predetermined defracting operation time, then bringing said refrigerating apparatus back to said refrigerating cycle, in case said idle-up means is in operation under said second idle-up condition.

Said control means brings said refrigeration apparatus back to said refrigerating cycle when a predetermined period of time elapses after said idle-up means being shifted to said first idle-up condition, said predetermined period of time is set to a time required for raising the engine rotational speed from a second idle-up rotational speed under the second idle-up condition to a first idle-up rotational speed under the first idle-up condition.

DETAILED DESCRIPTION OF THE PREFERRED EMBODIMENTS

The invention will now be described in further detail with reference to the accompanying drawings illustrating a preferred embodiment of the freezer/refrigerator vehicle constituted according to the present invention.

Figure 1:
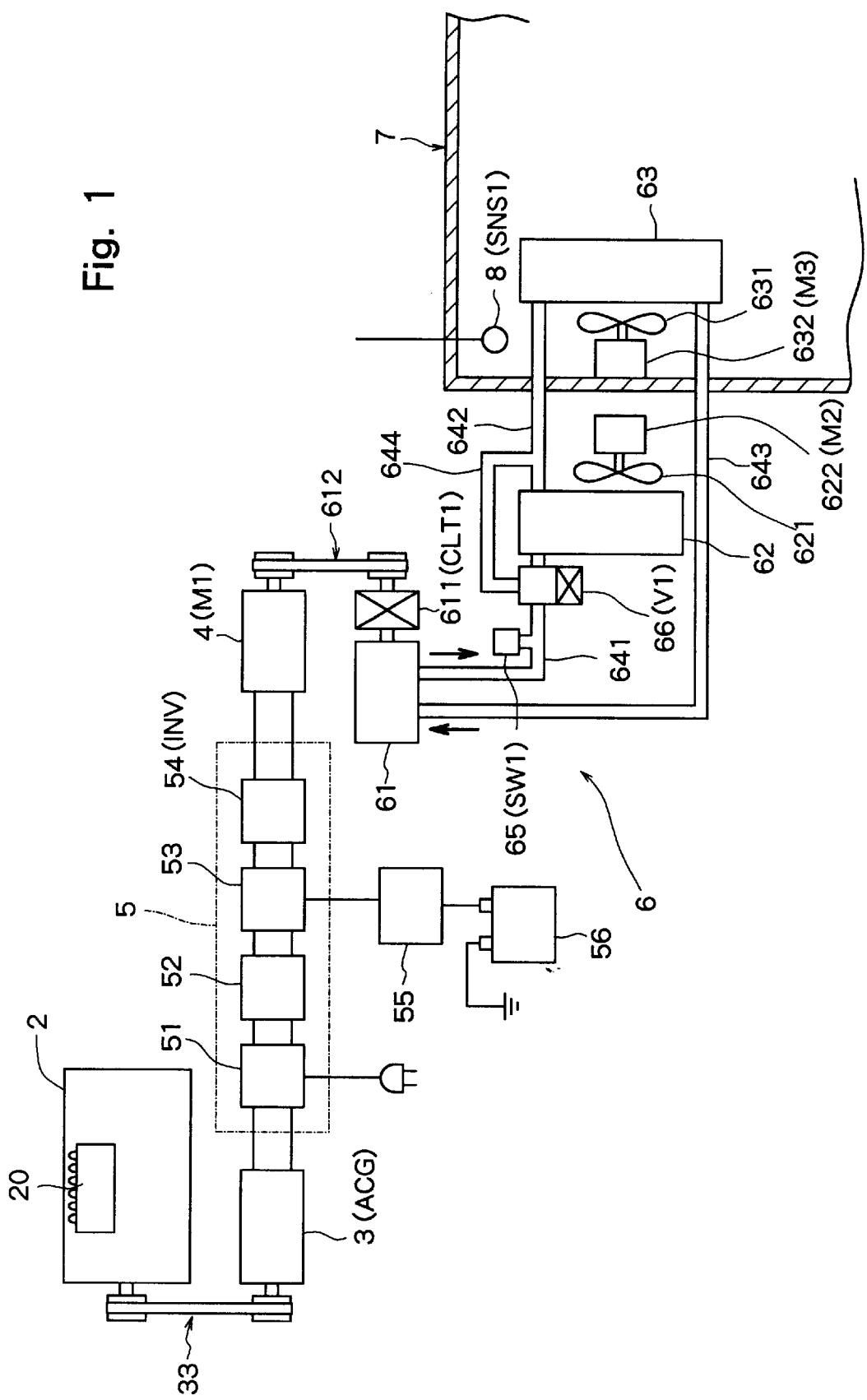
FIG. 1 is a block diagram schematically illustrating the constitution of a freezer/refrigerator vehicle constituted according to the present invention.

FIG. 1 is a block diagram schematically illustrating the constitution of a freezer/refrigerator vehicle constituted according to the present invention. The diagramed freezer/refrigerator vehicle is equipped with an AC generator 3 (ACG) driven by an engine 2, mounted on a vehicle, for running the vehicle, and an AC motor 4 (M1) driven by the electric power generated by the AC generator 3 (ACG). The AC generator 3 (ACG) is driven by the output shaft of the engine 2 for running the vehicle through, for example, a belt transmission mechanism 33. The AC output of the AC generator 3 (ACG) is supplied to the AC motor 4 (M1) through a power-source circuit 5. The power-source circuit 5 includes a power source switch 51, a rectifier 52, an automatic voltage regulator 53 and an inverter 54 (INV). The power source switch 51 is connected to the AC generator 3 (ACG) and to the commercial power source. When it is connected to the commercial power source, the commercial power source is connected to the rectifier 52, while it is not connected to the commercial power source, the AC generator 3 (ACG) is connected to the rectifier 52. The DC electric power rectified by the rectifier 52 and adjusted to a predetermined voltage by the automatic voltage regulator 53 is further converted into an alternating current through the inverter 54 (INV) and is controlled for its frequency by a control means that will be described later and then, is supplied to the AC motor 4 (M1). The AC motor 4 (M1) operates a refrigerating apparatus 6. In the diagramed embodiment, the DC electric power rectified by the rectifier 52 and adjusted to a predetermined voltage by the automatic voltage regulator 53, is electrically charged to a battery 56 mounted on the vehicle through a DC power-source circuit 55.

The refrigerating apparatus 6 includes a compressor 61, a condenser 62 and an evaporator 63. The compressor 61 is drivably coupled to the output shaft of the AC motor 4 (M1) via an electromagnetic clutch 611 (CLT1) and a belt transmission mechanism 612. When energized, the electromagnetic clutch 611 (CLT1) transmits the driving force to the compressor 61, and, when de-energized, interrupts the transmission of driving force to the compressor 61. The electromagnetic clutch 611 is controlled for its operation by a control means that will be described later.

The compressor 61, condenser 62 and evaporator 63 are connected through conduits 641, 642 and 643 as illustrated, and the coolant compressed by the compressor 61 circulates as indicated by arrows in the drawing. A pressure switch 65 (SW1) that detects the pressure of the coolant discharged from the compressor 61 is disposed in the conduit 641 connecting the compressor 61 to the condenser 62. When the pressure of the coolant exceeds a predetermined value, the pressure switch 65 (SW1) sends an ON signal to the control means that will be described later.

The conduit 641 connecting the compressor 61 to the condenser 62 and the conduit 642 connecting the condenser 62 to the evaporator 63 are connected together through a by-pass conduit 644 arranged to by-pass the condenser 62. An electromagnetic change-over valve 66 (V1) is disposed at a connection portion of the by-pass conduit 644 to the conduit 641. When de-energized, the electromagnetic change-over valve 66 (V1) sends the coolant to the condenser 62. When energized, the electromagnetic change-over valve 66 (V1) sends the coolant to the evaporator 63 through the by-pass conduit 644 and the conduit 642 to by-pass the condenser 62, this operation being controlled by the control means that will be described later. When the electromagnetic change-over valve 66 (V1) is de-energized, therefore, the coolant compressed by the compressor 61 circulates through the condenser 62 and the evaporator 63 to establish the refrigerating cycle. When the electromagnetic change-over valve 66 (V1) is energized, on the other hand, the coolant compressed by the compressor 61 is introduced into the evaporator 63 without passing the condenser 62 to establish the defrosting cycle.

The condenser 62 is arranged outside the housing of the freezer/refrigerator 7 mounted on the vehicle, and the evaporator 63 is arranged inside the housing of the freezer/refrigerator 7. The condenser 62 and the evaporator 63 are equipped with fans 621 and 632 which are driven by DC motors 622 (M2) and 632 (M3) energized by the battery 56 mounted on the vehicle. A temperature sensor 8 (SNS1) is disposed in the freezer/refrigerator 7 to detect the temperature therein, and sends a detection signal to the control means that will be described later.

In the diagramed embodiment, the engine 2 for running the vehicle is a diesel engine and is equipped with fuel injection pumps 20 as a fuel feeding device. The fuel injection pump 20 is equipped with the idle-up means for increasing the amount of fuel injection from the no-load condition during the idling condition where the accelerator pedal has not been depressed.

Figure 2:
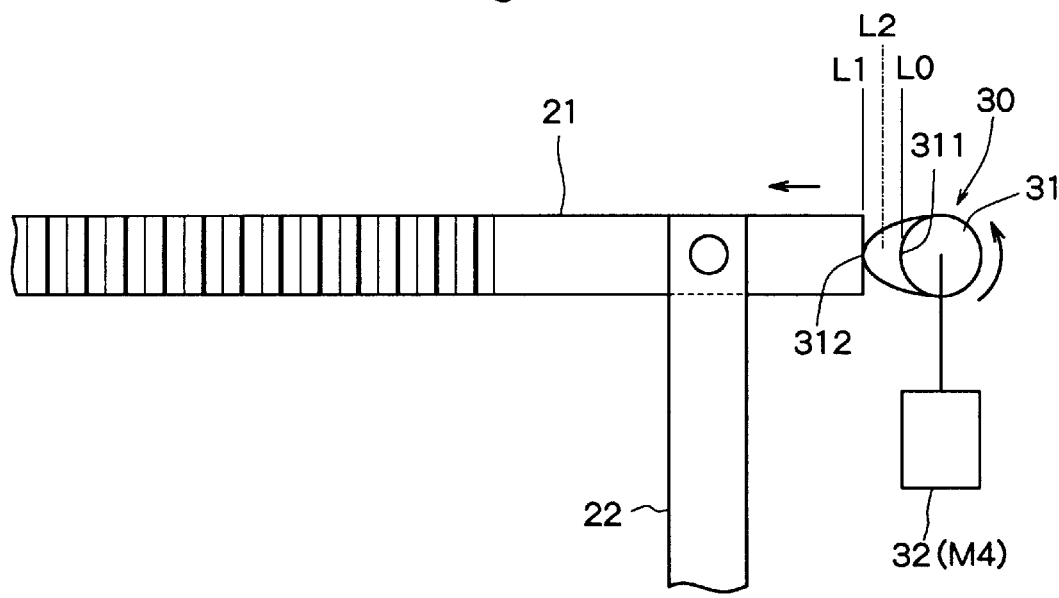
FIG. 2 is a side view schematically illustrating the constitution of an idle-up means provided for the freezer/refrigerator vehicle constituted according to the present invention.

Described below with reference to FIG. 2 is an example of the idle-up means.

The idle-up means 30 shown in FIG. 2 comprises an operation cam 31 disposed being opposed to an end of a fuel control rack 21 of the fuel injection pump 20, and a stepping motor 32 (M4) for turning the operation cam 31. The stepping motor 32 (M4) is controlled for its operation by the control means that will be described later. Under the idling condition where the accelerator pedal that is not shown has not been depressed, the accelerator pedal being coupled, via a link mechanism, to a floating lever 22 connected to the fuel control rack 21, the fuel control rack 21 comes into contact with the operation cam 31.

Under the no-load condition (e.g., engine rotational speed is 550 rpm) where the refrigerating apparatus 6 is not operated, a base circular portion 311 of the operation cam 31 comes into contact with the fuel control rack 21. Under the first idle-up condition where the fuel is supplied in an amount necessary for bringing the rotational speed of the engine 2 to the first idle-up rotational speed (e.g., 800 rpm) to operate the refrigerating apparatus 6, the operation cam 31 is turned so as to bring a cam nose portion 312 into contact with the fuel control rack 21. Under the idling condition where the accelerator pedal is not depressed, therefore, the fuel control rack 21 under the no-load condition is brought to a no-load position L0 where it comes in contact with the base circular portion 311 of the operation cam 31, and under the first idle-up condition, the fuel control rack 21 is brought to a first idle-up position L1 where it comes in contact with the cam nose portion 312 of the operation cam 31. Accordingly, the fuel control rack 21 brought to the first idle-up position L1 is moved by a predetermined amount toward the direction of increasing fuel indicated by an arrow from the no-load position L0. Further, the diagrammed idle-up means 30 turns the operation cam 31 from the first idle-up condition toward a direction indicated by an arrow by a predetermined angle by the stepping motor 32 (M4), so that the operation cam 31 is brought to a second idle-up position L2 where the fuel control rack 21 comes in contact with the cam surface between the cam nose portion 312 and the base circular portion 311. When the fuel control rack 21 is positioned at the second idle-up position L2, the amount of feeding fuel becomes smaller than that of the first idle-up condition, whereby the rotational speed of the engine 2 decreases down to the second idle-up rotational speed (e.g., 650 rpm), resulting in decrease in the engine noise.

Though the idle-up means shown in FIG. 2 is constituted by the operation cam 31 and the stepping motor 32 (M4), it is also allowable to employ an electromagnetic means for stepwisely controlling the position of contact of the fuel control rack 21. Further, the idle-up means shown in FIG. 2 is applied to the fuel injection pump 20 equipped with a mechanical governor, but in the case of the fuel injection pump 20 equipped with an electronic governor, the amount of feeding fuel can be controlled by controlling the electric current supplied to the electronic governor.

Figure 3:
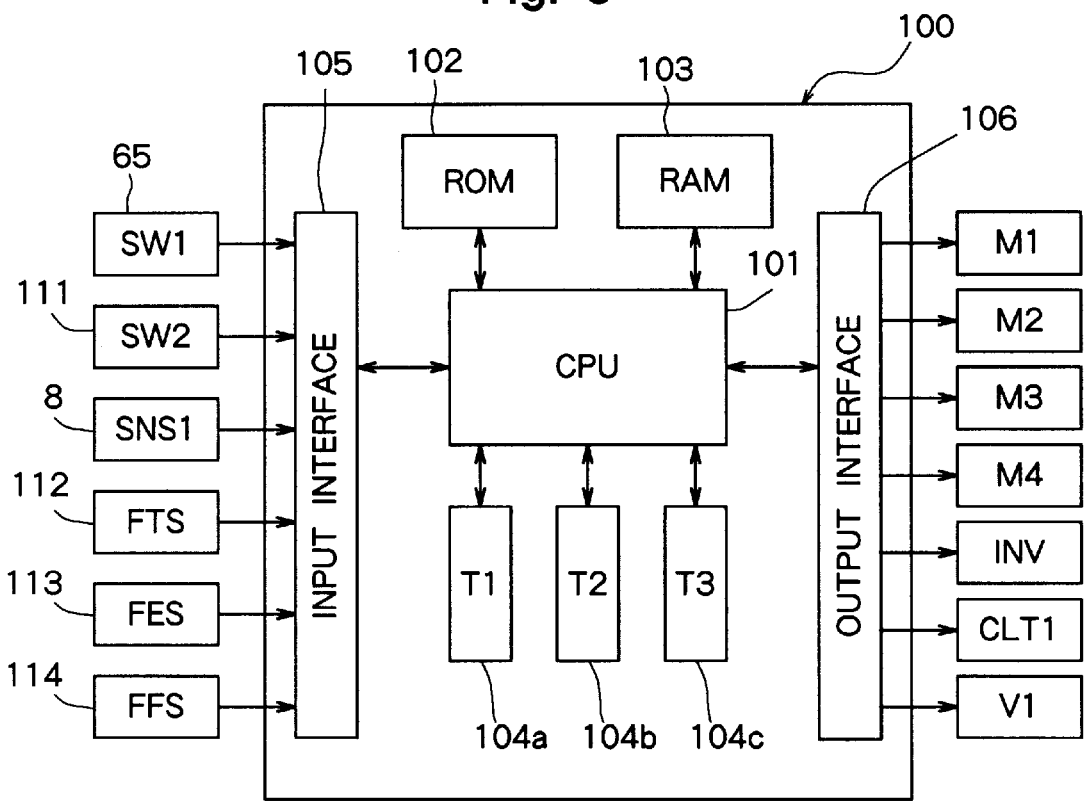
FIG. 3 is a block diagram of a control means provided for the freezer/refrigerator vehicle constituted according to the present invention.

The diagramed freezer/refrigerator vehicle is equipped with the control means 100 shown in FIG. 3. The control means 100 is constituted by a microcomputer and includes a central processing unit (CPU) 101 for executing the arithmetic operation according to a control program, a read-only memory (ROM) 102 for storing the control program, a read-write random access memory (RAM) 103 for storing the results of operation, a first timer 104a (T1), a second timer 104b (T2), a third timer 104c (T3), an input interface 105 and an output interface 106. Among the above-mentioned three timers, the first timer 104a (T1) functions as a first timer means for counting the operation time (e.g., three hours) in which the refrigerating apparatus has operated in the above-mentioned refrigerating cycle, and the second timer 104b (T2) functions as a second timer means for counting the operation time (e.g., ten minutes) in which the refrigerating apparatus has operated in the above-mentioned defrosting cycle. The input interface 105 of the thus constituted control means 100 receives detection signals from the pressure switch 65 (SW1) and the temperature sensor 8 (SNS1) in the refrigerating apparatus. The input interface 105 further receives signals from a refrigerating apparatus operation switch 111 (SW2), a refrigerating temperature setter 112 (FTS), a refrigerating time setter 113 (FES) for setting the time for operation in the refrigerating cycle, and a defrosting time setter 114 (FFS) for setting the time for operation in the defrosting cycle, those being arranged on a control board in the cab, that is not shown, of the freezer/refrigerator vehicle. On the other hand, the output interface 106 sends control signals to the AC motor 4 (M1), DC motors 622 (M2) and 632 (M3), stepping motor 32 (M4), inverter 54 (INV), electromagnetic clutch 611 (CLT1), electromagnetic change-over valve (V1) and the like. In this connection, the control means 100 must be maintained in operation to integrate the operation time in the refrigerating cycle even when the power source circuit is turned off and is, hence, equipped with a back-up power source that is not shown.

The freezer/refrigerator vehicle of the diagramed embodiment of the present invention is constituted as described above. The operation will now be described.

When the refrigerating apparatus operation switch 111 (SW2) is closed and, based on a detection signal from the temperature sensor 8 (SNS1) in the refrigerating apparatus, the temperature in the refrigerator is higher than a first preset temperature that is arbitrarily set by using the refrigerating temperature setter 112 (FTS), the control means 100 energizes the electromagnetic clutch 611 (CLT1) to drive the compressor 61 and further the DC motors 622 (M2) and 632 (M3) for driving fans, whereby the refrigerating apparatus 6 is operated. As the refrigerating apparatus 6 operates as described above, the temperature in the refrigerator lowers. When the temperature in the refrigerator becomes lower than a second preset temperature which is lower than the first preset temperature, the control means 100 de-energizes the electromagnetic clutch 611 (CLT1) to stop driving of the compressor 61 and, further, de-energizes the DC motors 622 (M2) and 632 (M3) for driving fans thereby to discontinue the operation of the refrigerating apparatus 6. When the pressure of the coolant discharged from the compressor 61 exceeds a predetermined value during operation of the refrigerating apparatus 6, the members constituting the refrigerating apparatus 6 may undergo a breakage. When an ON signal is sent from the pressure switch 65 (SW1), therefore, the control means 100 de-energizes the electromagnetic clutch 611 (CLT1) to no longer drive the compressor 61 and, further, de-energizes the DC motors 622 (M2) and 632 (M3) that drive fans to stop the operation of the refrigerating apparatus 6. Further, when the time for operation in the refrigerating cycle reaches a predetermined refrigerating time (e.g., three hours) set by using the refrigerating time setter 113 (FES), the control means 100 energizes the electromagnetic changeover valve 66 to execute the defrosting cycle. As a result, the coolant discharged from the compressor 61 is directly introduced into the evaporator 63 without passing the condenser 62, whereby frost adhered on the evaporator 63 is removed. After the operation in the defrosting cycle for a predetermined period of time (e.g., ten minutes) set by the defrosting time setter 114 (FFS), the control means 100 de-energizes the electromagnetic changeover valve 66 to resume the refrigerating cycle.

Figure 4:
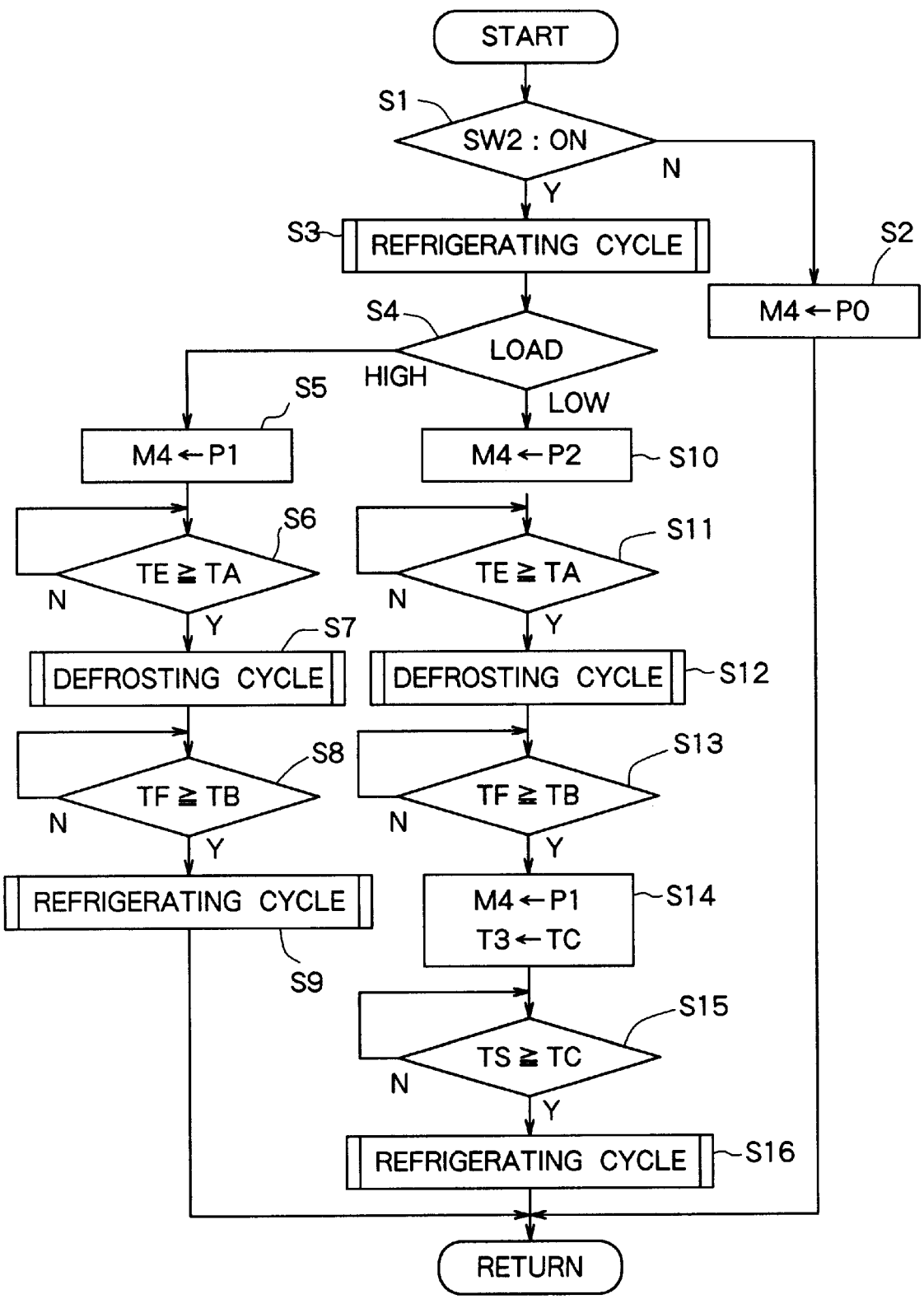
FIG. 4 is a flow chart illustrating the action of the control means shown in FIG. 3.

Next, the operation of the control means 100 under the idling condition where the accelerator pedal of the engine 2 for running the vehicle is not depressed, will be described below with reference also to a flow chart of FIG. 4.

At step S1, the control means 100 checks whether the refrigerating apparatus operation switch 111 (SW2) has been turned on, i.e., closed. When the refrigerating apparatus operation switch 111 (SW2) has not been turned on at step S1, the refrigerating apparatus 6 does not operate, and the engine 2 does not bear the load of operating the refrigerating apparatus 6. Therefore, the routine proceeds to step S2 where the control means 100 turns the stepping motor 32 (M4) of the idle-up means 30 to a rotational position P0 where the base circular portion 311 of the operation cam 31 comes in contact with the fuel control rack 21. The fuel control rack 21 is thus brought to the no-load position L0. With the fuel control rack 21 being located at the no-load position L0, the engine 2 is operated at a rotational speed of, for example, 550 rpm.

When the refrigerating apparatus operation switch 111 (SW2) is turned on at step S1, the routine proceeds to step S3 where the control means 100 executes the refrigerating cycle. In the refrigerating cycle, the control means 100 de-energizes the electromagnetic changeover valve 66 (V1), and energizes the DC motors 622 (M2) and 632 (M3) to drive the fans 621 and 631 for the condenser 62 and evaporator 63.

Then, the routine proceeds to step S4 where the control means 100 checks whether the load of the refrigerating apparatus is high or low. The load of the refrigerating apparatus is judged based, for example, on a signal from a sunlight amount sensor or a parking brake switch that is not shown (for details, reference should be made to the above-mentioned Japanese Patent Applications Nos. 288310/1998 and 288311/1998). When the load of the refrigerating apparatus is high at step S4, the control means 100 executes steps between S5 and S9. When the load of the refrigerating apparatus is low at step S4, the control means 100 executes steps between S10 and S16.

When the load of the refrigerating apparatus is high at step S4, the routine proceeds to step S5 where the control means 100 turns the stepping motor 32 (M4) of the idle-up means 30 to a rotational position P1 where the cam nose portion 312 of the operation cam 31 comes in contact with the fuel control rack 21. The fuel control rack 21 is thus brought to the first idle-up position L1. With the fuel control rack 21 being brought to the first idle-up position L1, the engine 2 is operated at, for example, 800 rpm which is the first idle-up rotational speed. Next, the routine proceeds to step S6 where the control means 100 checks whether the operation time (TE) in the refrigerating cycle counted by the first timer 104a (T1) has reached a predetermined refrigerating time (TA: e.g., three hours) set by using the refrigerating time setter 113 (FES). When the operation time (TE) in the refrigerating cycle has not reached the refrigerating time (TA), a lapse of the time is waited for. When the operation time (TE) has reached the refrigerating time (TA), the routine proceeds to step S7 where the control means 100 executes the defrosting cycle. That is, the control means 100 energizes the electromagnetic changeover valve 66 (V1) to stop operation of the DC motors 622 (M2) and 632 (M3) that drive fans 621 and 632 for the condenser 62 and evaporator 63.

After the defrosting cycle is executed at step S7, the routine proceeds to step S8 where the control means 100 checks whether the operation time (TF) in the defrosting cycle counted by the second timer 104b (T2) has reached a predetermined defrosting time (TB: e.g., ten minutes) set by the defrosting time setter 114 (FFS). When the operation time (TF) in the defrosting cycle has not reached the defrosting time (TB), a lapse of the time is waited for. When the operation time (TF) has reached the defrosting time (TB), the routine proceeds to step S9 where the control means 100 brings the refrigerating apparatus 6 back to the refrigerating cycle again.

When the load of the refrigerating apparatus is low at step S4, on the other hand, the control means 100 executes steps between S10 and S16. That is, at step S10, the control means 100 turns the stepping motor 32 (M4) of the idle-up means 30 to a rotational position P2 where the fuel control rack 21 comes in contact with the cam surface between the cam nose portion 312 of the operation cam 31 and the base circular portion 311. Thus, the fuel control rack 21 is located at the second idle-up position L2. With the fuel control rack 21 being located at the second idle-up position L2, the engine 2 is operated at a rotational speed of, for example, 650 rpm which is the second idle-up rotational speed. Therefore, the engine 2 is operated at a rotational speed lower than that of the first idle-up condition, whereby the engine noise can be decreased. Here, if the rotational speed of the DC motor 622 (M2) that drives the fan 621 of the condenser 62 is lowered, the rotational speed of the fan 621 of the condenser 62 decreases and hence, noise due to the fan can be also decreased.

Then, the control means 100 executes steps between S11 and S13. Here, steps S11 through S13 are substantially the same as steps S6 through S8 described above.

Upon executing steps S11 to S13, when the operation time (TF) in the defrosting cycle has reached the defrosting time (TB), the routine proceeds to step S14 where the control means 100 turns the stepping motor 32 (M4) of the idle-up means 30 to the rotational position P1. Accordingly, the fuel control rack 21 is located at the first idle-up position L1 as described above, and the rotational speed of the engine 2 is increased to be, for example, 800 rpm which is the first idle-up rotational speed. The control means 100, then, sets the third timer 104c (T3) to a preset time (TC). The preset time (TC) is set to a time (i.e., three seconds) required by the engine 2 to increase its rotational speed from the second idle-up rotational speed which is, for example, 650 rpm to the first idle-up rotational speed which is, for example, 800 rpm. Next, the routine proceeds to step S15 where the control means 100 checks whether the elapsed time (TS) after the stepping motor 32 (M4) was turned to P1 at step S14 has reached the preset time (TC). When the elapsed time (TS) has not reached the preset time (TC), a lapse of the time is waited for. When the elapsed time (TS) has reached the preset time (TC), the routine proceeds to step S16 where the control means 100 resumes the refrigerating cycle. Thus, after the defrosting cycle is executed while the engine 2 is in operation under the second idle-up condition lower than the first idle-up condition, the engine 2 is shifted under the first idle-up condition and then, the refrigerating cycle is resumed. Even when the load of refrigeration is suddenly exerted, therefore, the engine 2 continues to smoothly operate and the refrigerating cycle is smoothly conducted.

The invention was described above by way of the diagramed embodiment. It should, however, be noted that the invention is in no way limited to the above-mentioned embodiment only but can be changed and modified in a variety of ways without departing from the technical spirit and scope of the invention. In the diagramed embodiment, for example, the invention was applied to a freezer/refrigerator vehicle of the type in which the AC generator was driven by the engine for running the vehicle, and the compressor of the refrigerating apparatus was driven by the AC motor that is driven by the output of the AC generator. The invention, however, can also be applied to the freezer/refrigerator vehicle of the type in which the compressor of the refrigerating apparatus is directly driven by the engine for running the vehicle through a clutch.

The thus constituted freezer/refrigerator vehicle of the present invention offers functions and effects as described below.

That is, provision is made of an idle-up means for operating a fuel feeding device of the engine under a first idle-up condition or under a second idle-up condition between the first idle-up condition and the no-load condition when the refrigerating apparatus is in operation during the idling of the engine, and the refrigerating apparatus is made to operate in the defrosting cycle when the operation time in the refrigerating cycle has reached a predetermined refrigerating cycle operation time while the idle-up means is in operation under the second idle-up condition, thereafter the idle-up means is made to operate under the first idle-up condition when the operation time in the defrosting cycle has reached a predetermined defrosting cycle operation time, and then, the refrigerating apparatus is allowed to be brought back to the refrigerating cycle after the passage of a predetermined period of time. Accordingly, the engine smoothly operates even when the load of refrigeration is suddenly exerted at the time when the defrosting cycle is brought back to the refrigerating cycle, and the refrigerating cycle can be smoothly conducted.

What we claim is:

1. A freezer/refrigerator vehicle equipped with a refrigerating apparatus which has a refrigerating cycle for circulating the coolant compressed by a compressor through a condenser and an evaporator and a defrosting cycle for introducing the coolant compressed by the compressor into the evaporator without passing the condenser, said refrigerating apparatus being driven by a drive source which is an engine, mounted on a vehicle, for running the vehicle, comprising:

an idle-up means for operating a fuel feeding device of said engine under a first idle-up condition or under a second idle-up condition between said first idle-up condition and the no-load condition when said refrigerating apparatus is in operation during the idling of said engine;

a first timer means for counting the time in which said refrigerating apparatus has operated in said refrigerating cycle;

a second timer means for counting the time in which said refrigerating apparatus has operated in said defrosting cycle; and a control means for controlling said refrigerating apparatus and said idle-up means, said control means bringing said refrigerating apparatus to said defrosting cycle when the operation time counted by said first timer means has reached a predetermined refrigerating operation time, and bringing said refrigerating apparatus back to said refrigerating cycle when the operation time counted by said second timer means has reached a predetermined defrosting operation time, and said control means shifting said idle-up means to said first idle-up condition when the operation time counted by said second timer means has reached said predetermined defracting operation time, then bringing said refrigerating apparatus back to said refrigerating cycle, in case said idle-up means is in operation under said second idle-up condition.

2. A freezer/refrigerator vehicle according to claim 1, wherein said control means brings said refrigeration apparatus back to said refrigerating cycle when a predetermined period of time elapses after said idle-up means being shifted to said first idle-up condition, said predetermined period of time is set to a time required for raising the engine rotational speed from a second idle-up rotational speed under the second idle-up condition to a first idle-up rotational speed under the first idle-up condition.

* * * * *